A. BURKE.
SPECTACLE TEMPLE CONNECTION.
APPLICATION FILED MAY 26, 1917.
1,294,390.
Patented Feb. 18, 1919.
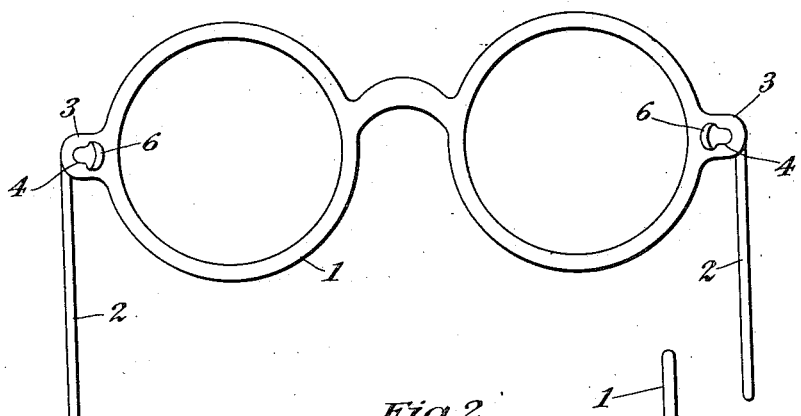
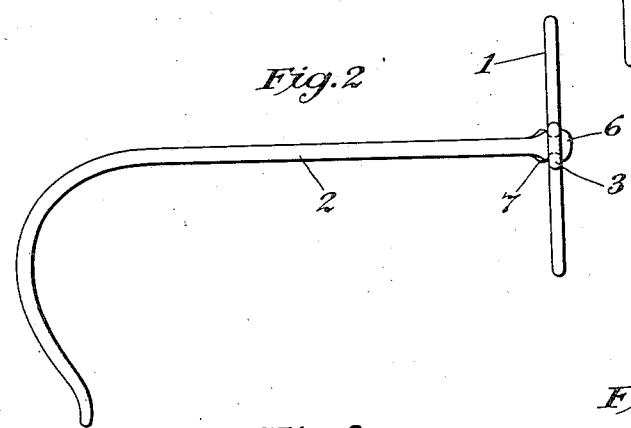
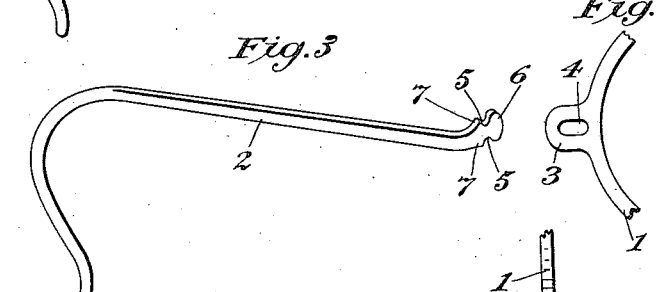
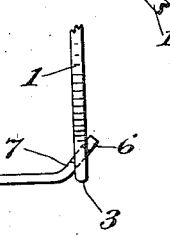
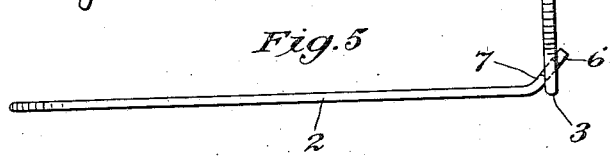
Inventor:
Alfred Burke
by
Attorney.

UNITED STATES PATENT OFFICE.

ALFRED BURKE, OF BROOKLYN, NEW YORK.

SPECTACLE-TEMPLE CONNECTION.

1,294,390.  Specification of Letters Patent.  Patented Feb. 18, 1919.

Application filed May 26, 1917. Serial No. 171,111.

*To all whom it may concern:*

Be it known that I, ALFRED BURKE, a citizen of the United States, residing at the borough of Brooklyn, in the city of New York, county of Kings, and State of New York, have invented certain new and useful Improvements in Spectacle-Temple Connections, of which the following is a specification.

My invention relates to means for connecting the temples of a spectacle with the lens frame.

Heretofore it has been usual to provide each end of the frame with a pair of lugs spaced apart to form a socket between them for receiving the end of the temple, a hole being drilled through the parts into which a pin is riveted to form a pivotal hinge for the temple. The rivet hole tends to weaken the stock and the drilling thereof frequently results in fracturing the material.

According to my invention I produce a temple connection without the necessity of drilling or riveting the parts of the joint. A temple connection made according to my invention is less expensive to manufacture and assemble than those heretofore made, and the parts may be constructed of thinner material than heretofore used. Furthermore, my construction permits of lateral self-adjustment of the temples relative to the frame to accommodate for different widths of faces.

To these ends my invention consists in the construction and arrangement of parts hereinafter described and particularly pointed out in the claims.

In the accompanying drawings illustrating my invention, Figure 1 is a front view of a spectacle frame showing the temples attached; Fig. 2 is an end edge view of the same; Fig. 3 is a perspective view of a detached temple; Fig. 4 is a view of a fragment of an end of the frame; Fig. 5 is a top edge view of an end of the frame and connected temple.

Referring to the drawings 1 indicates a spectacle frame and 2, 2 the temples.

Extending laterally from the frame in the plane thereof are the temple connecting portions 3, 3 each provided with a longitudinal slot 4 having its ends closed.

Near the forward end of the temple is formed a pair of oppositely disposed notches 5, 5, the distance between the notches being approximately equal to the width of the slot. The extremity of the temple adjacent to the forward portion of the notches is provided with a head 6, the extreme vertical dimension of which is greater than the width of the slot. If desired, shoulders 7 may be formed adjacent to the rear portion of the notches to prevent the temples from being pushed too far forward.

Preferably the forward ends of the temples are curved or bent inwardly as shown in Figs. 3 and 5, so that when the temples are in folded position they will lie substantially flat against the back of the frame.

To connect the parts, the temple is held with its head 6 in horizontal position, in which position it is passed through the slot 4. The temple is then turned through an arc 90° to cause the notches 5, 5 to engage and ride on the edges of the slot. It is obvious that, because of the fact that the head of the temple is wider than the slot, the parts, when in assembled position, cannot be disconnected. This arrangement provides a very simple, inexpensive and efficient hinged connection between the temples and the frame, and permits of slight lateral self-adjustment of the parts.

Various modifications may be made in the details of construction herein described and illustrated without departing from the scope of my invention.

What I claim is:

1. A spectacle-temple connection comprising a lens frame having a laterally extending portion provided with a closed-end slot, and a temple provided with oppositely disposed notches engaging the edges of the slot, said notches being spaced apart a distance approximately equal to the width of the slot, the end of the temple being adapted to be inserted in the slot so as to cause the notches to engage the edges of the slot on giving the temple a quarter turn.

2. A spectacle-temple connection comprising a lens frame having a laterally extending portion provided with a closed-end slot, and a temple provided with oppositely disposed notches engaging the edges of the slot and having an enlarged head, the major dimension of which is greater than the width of the slot but less than its length.

ALFRED BURKE.